(12) United States Patent
Bastiyali (10) Patent No.: US 12,071,099 B2
(45) Date of Patent: Aug. 27, 2024

(54) SMART SAFE CONSOLE SYSTEM

(71) Applicant: Tarkan Bastiyali, New York, NY (US)

(72) Inventor: Tarkan Bastiyali, New York, NY (US)

(73) Assignee: Smartsafe Console, LLC, Las Vegas, NV (US)

( * ) Notice: Subject to any disclaimer, the term of this patent is extended or adjusted under 35 U.S.C. 154(b) by 155 days.

(21) Appl. No.: 17/661,608

(22) Filed: May 2, 2022

(65) Prior Publication Data

US 2023/0249645 A1 Aug. 10, 2023

Related U.S. Application Data (63) Continuation-in-part of application No. 17/650,354, filed on Feb. 8, 2022.

(51) Int. Cl.
| | |
|---|---|
| *B60R 25/24* | (2013.01) |
| *B60R 7/04* | (2006.01) |
| *B60R 16/03* | (2006.01) |
| *B60R 25/20* | (2013.01) |
| *B60R 25/22* | (2013.01) |

(52) U.S. Cl.
CPC ............... *B60R 25/24* (2013.01); *B60R 7/04* (2013.01); *B60R 16/03* (2013.01); *B60R 25/209* (2013.01); *B60R 25/22* (2013.01)

(58) Field of Classification Search
CPC ........... B60K 28/08; B60R 7/04; B60R 16/03; B60R 2011/0075; B60R 25/209; B60R 25/22; B60R 25/24; E05B 83/32
See application file for complete search history.

(56) References Cited

U.S. PATENT DOCUMENTS

| | | | | |
|---|---|---|---|---|
| 9,783,124 B2 * | 10/2017 | Catlin | .................. | H04B 1/3877 |
| 9,900,417 B1 * | 2/2018 | Ruiz | ................... | B60R 11/0241 |
| 10,011,240 B1 * | 7/2018 | Ranganathan | ......... | B60N 3/101 |
| 10,027,795 B1 * | 7/2018 | Maguire | .................. | G08B 3/10 |
| 10,440,633 B1 * | 10/2019 | Bastiyali | ................. | B60R 7/087 |
| 2014/0054430 A1 * | 2/2014 | Jacobson | ............... | F16M 13/02 |
| | | | | 248/295.11 |
| 2014/0287709 A1 * | 9/2014 | Iwade | ..................... | B60R 11/02 |
| | | | | 455/345 |
| 2017/0064056 A1 * | 3/2017 | Uhlig | ..................... | B60R 11/02 |

(Continued)

FOREIGN PATENT DOCUMENTS

| | | | |
|---|---|---|---|
| DE | 102017200711 A1 * | 7/2018 | |
| DE | 102018211954 A1 * | 3/2019 | ............. B60R 11/02 |

(Continued)

OTHER PUBLICATIONS

International Search Report including Written Opinion for Application No. PCT/US2024/010847 mailed Feb. 23, 2024. 9 pgs.

*Primary Examiner* — Drew J Brown
(74) *Attorney, Agent, or Firm* — Lerner David LLP (57) ABSTRACT

A smart safe console system is provided herein. The smart safe console system includes a smart safe console assembly for mounting in a vehicle, having a safe body suitable for securing an electronic device, a button configured for controlling input and output to and from the electronic device when a vehicle hosting the smart safe console system is in use, and a wireless charging apparatus. Such smart safe console system is useful for improving the safety of a user when traveling in a vehicle with an electronic device.

8 Claims, 10 Drawing Sheets

(56) References Cited

U.S. PATENT DOCUMENTS

| | | | | |
|---|---|---|---|---|
| 2019/0077371 A1* | 3/2019 | Gaither | .................... | B60R 25/24 |
| 2019/0143935 A1* | 5/2019 | Flick | ........................ | G07C 5/08 |
| | | | | 701/2 |
| 2021/0222660 A1* | 7/2021 | Gil Vera | ................ | B60R 25/045 |
| 2023/0264655 A1* | 8/2023 | Reber | ..................... | H02J 50/90 |
| | | | | 320/107 |

FOREIGN PATENT DOCUMENTS

| | | | | |
|---|---|---|---|---|
| DE | 102018219007 A1 | * 11/2019 | ............. | B60R 11/02 |
| EP | 3718818 A1 | * 10/2020 | ............. | B60N 2/005 |
| KR | 20220160751 A | * 12/2022 | | |

* cited by examiner

SMART SAFE CONSOLE SYSTEM

CLAIM OF PRIORITY

This application claims priority to U.S. patent application Ser. No. 17/650,354, filed Feb. 8, 2022, entitled "Smart Safe Console System", the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present invention relates generally to the field of vehicle safety of existing art and more specifically relates to containment systems for electronic devices.

BACKGROUND

Electronic devices like phones, tablets, smart glasses, and the like are becoming increasingly common in modern times. Such devices can be used for a variety of tasks including messaging, phone conversations, social media, navigation, photography, etc. With so many features offered on electronic devices, many people struggle to stop using the device during necessary times such as operating a vehicle. Many vehicle accidents are a result from distractions caused by electronic devices which is dangerous for public road safety.

Prior attempts to solve this problem include inhibiting all features and communications to and from the electronic device. However, the electronic devices offer a variety of resources that can be useful to a user or operator. Further, family members or friends can become worried when a message or phone call is not returned. Therefore, a suitable solution is required.

SUMMARY OF THE INVENTION

The present disclosure provides a smart safe console system comprising an assembly mounted in a vehicle, the smart safe console system including: a safe body that during vehicle use secures an electronic device against physical access, preferably where the safe body opens and closes, and, when closed, the safe body secures the electronic device against physical access, preferably where the safe body is configured to communicate with the electronic device, when the electronic device is placed within the safe body. In an embodiment, the smart safe console system includes a button that controls input to and output from the electronic device. In an embodiment, the smart safe console system includes a wireless charging apparatus configured to wirelessly charge the electronic device, when the electronic device is placed within the safe body. In an embodiment, the smart safe console system includes a control module that is configured to prevent operation of the vehicle unless the safe body is closed and the electronic device is secured within the safe body. In an embodiment, the smart safe console system includes an override apparatus configured to allow a user to override the control module and permit operation of the vehicle when the electronic device is not secured within the safe body.

In an embodiment, the override apparatus includes a handheld device. In an embodiment, the handheld device includes an override key. In an embodiment, the override key is concealed within an internal compartment of the handheld device. In an embodiment, the handheld device includes a digital screen.

In an embodiment, the override apparatus includes a notification system configured to notify an external user when a user requests override of the control module and requires authorization from the external user to override the control module and permit operation of the vehicle. In an embodiment, the override apparatus notifies an external user when a user requests override of the control module and requires authorization from the external user to displace the override key from the internal compartment.

In an embodiment, the notification system includes a notification indicator configured to notify the user when the external user has granted authorization to override the control module and permit operation of the vehicle. In an embodiment, the notification indicator includes one or more of: colored lights or LEDs, vibration systems, digital screens, or sound systems.

In an embodiment, the safe body includes a first cap concealing a first keyhole and a second cap concealing second keyhole, the first keyhole configured such that when the override key is inserted into the first keyhole and turned, the safe body is opened, and the second key configured such that when the override key is inserted into the second keyhole and turned, an engine of the vehicle is started and operation of the vehicle is permitted.

In an embodiment, the override apparatus includes a specialized tool for removing each of the first cap and the second cap to reveal each of the first keyhole and the second keyhole, respectively. In an embodiment, the first keyhole is disposed on the exterior of the safe body and the second keyhole is disposed in the interior of the safe body.

In an embodiment, the handheld device includes an emergency button, configured such that when depressed, the smart safe console system is configured to alert emergency authorities. In an embodiment, the alert of emergency authorities includes one or more of: alerting an emergency telephone line, providing emergency authorities with vehicle information, providing emergency authorities with personal identification information, and providing emergency authorities with location information.

In an embodiment, the handheld device is waterproof.

In an embodiment, the smart safe console system includes an override case designed to contain the handheld device and the specialized tool.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

For purposes of the present disclosure of the invention, unless specifically disclaimed, the singular includes the plural and vice-versa, the words "and" and "or" shall be both conjunctive and disjunctive, the words "any" and "all" shall both mean "any and all".

As discussed above, embodiments of the present disclosure relate to containment systems for electronic devices and more particularly to a smart safe console system and method as used to improve vehicle safety while utilizing features on electronic devices.

Generally, the present invention includes a console which may be compatible with a variety of electronic devices such as smart phones, smart watches (iWatches), and smart glasses. The system may be installed in the area between an operator and a passenger, typically called the 'middle console', in any vehicle such as a train, boat, truck, or car. The area between an operator and a passenger may also be a center console armrest in some embodiments. With the electronic devices locked away in the present invention, the operator can manipulate the vehicle with their full attention and any passengers do not have to worry if the operator is texting on the electronic device, on a social media site, or otherwise distracted.

Referring now more specifically to the drawings by numerals of reference, there is shown in FIGS. 1-4, various views of a smart safe console system 100.

Figure 1:
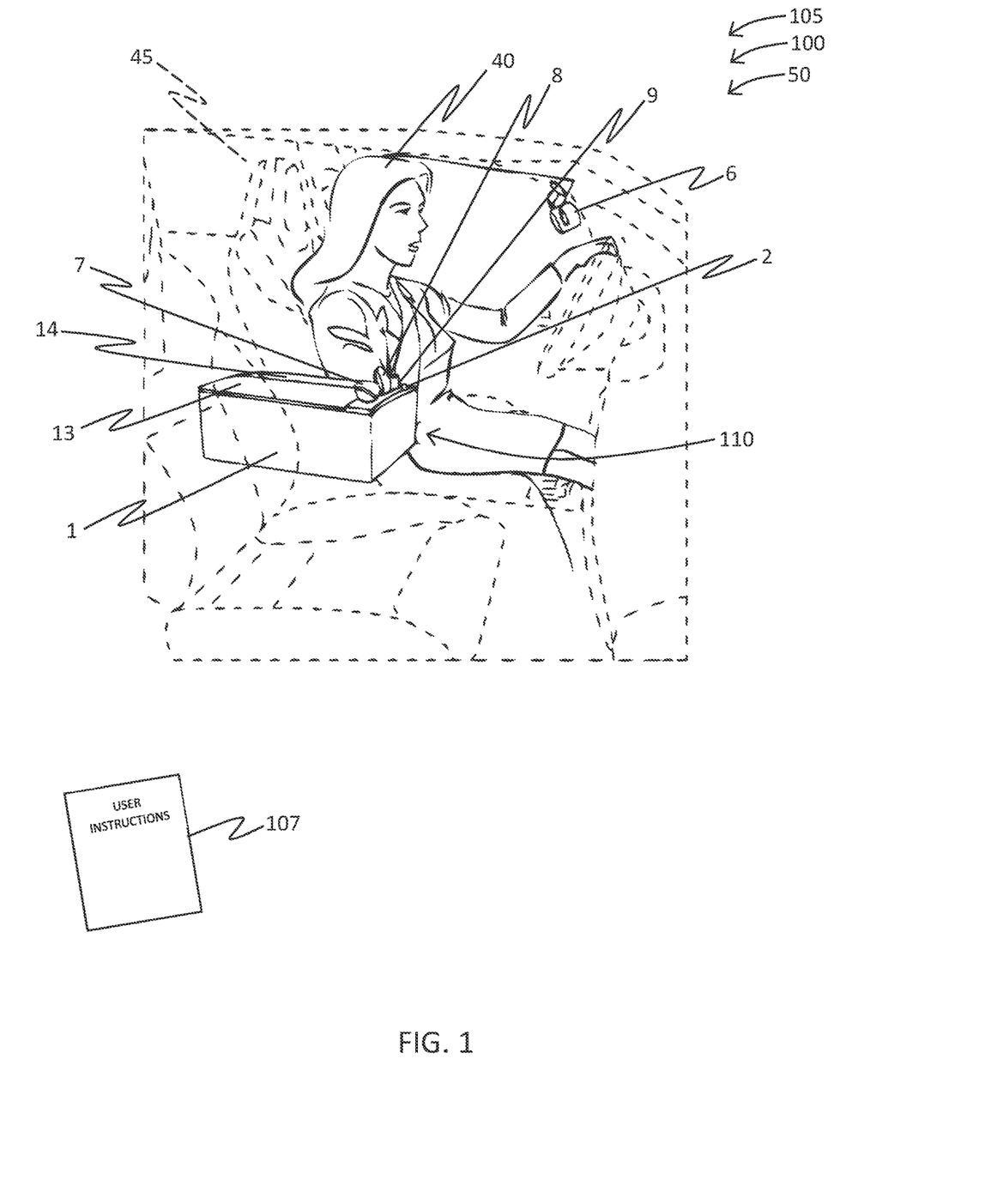
FIG. 1 is a perspective view of the smart safe console system during an 'in-use' condition, according to an embodiment of the disclosure.

FIG. 1 shows smart safe console system 100 during an 'in-use' condition 50, according to an embodiment of the present disclosure. Here, the smart safe console system 100 may be beneficial for use by an operator 40 to improve vehicle safety in relation to the use of electronic devices 21. As illustrated, the smart safe console system 100 may comprise a smart safe console assembly 110 including a smart safe body 1 suitable to house at least one electronic device 21. The electronic device 21 may be able to be isolated from hand-held use by the smart safe body 1.

The smart safe console assembly 110 may also include an engager-button 2 configured for controlling input and output communications to and from the electronic device 21 (e.g., text messages) when a vehicle 45 hosting the smart safe console system 100 is in use. The smart safe console assembly 110 may be in communication with a provider and/or with the vehicle 45 and may be configured to control use of the electronic device 21 in relation to manipulation of the vehicle 45.

The provider may provide cellular-phone-service (e.g., phone carriers), internet service (e.g., wireless communication network) to the electronic device 21. Those with ordinary skill in the art will now appreciate that upon reading this specification and by their understanding the art of communications with the electronic device 21 as described herein, methods of restraining, manipulating, providing, safely limiting will be understood by those knowledgeable in such art.

The vehicle 45 may host the smart safe console system 100 such that the smart safe console assembly 110 may be hardwired to the circuitry of the vehicle 45. The vehicle 45 may provide an energy source (e.g. vehicle battery) for powering the smart safe console system 100. Alternatively, the smart safe console assembly 110 may include a self-contained battery for powering the smart safe console system 100. The smart safe console system 100 may be powered by AC power distributed throughout the smart safe console assembly 110 by a DC power supply (e.g. vehicle battery). Other powering means may be used. Hardwired and non-hardwired versions may be employed.

The smart safe console assembly 110 may be in communication with sensors on the vehicle 45 with the sensors able to sense at least one condition of the vehicle 45. The at least one condition of the vehicle 45 may be measured via a proximity sensor, a motion sensor, a speed sensor, an audio sensor, an impact sensor, or combination thereof. The sensors may provide one or more functions for the smart safe console assembly 110 such as sending an automatically generated message from the electronic device 21 to a desired recipient when the impact sensor is sensed. The impact sensor may indicate that an accident to the vehicle 45 has occurred. The desired recipient can be a family member, friend, or third-party (i.e., police). Sensing means may vary.

The smart safe console system 100 may further comprise at least one cigarette socket 3 along an exterior-portion of the smart safe body 1 configured for communicating and powering one or more external electrical accessories with the smart safe console assembly 110.

Another aspect of the present invention may provide for a software application (SW App) that is hosted on the electronic device 21. The software application may be downloaded on the electronic device's 21 memory and be configured to register and facilitate communication between the electronic device 21 and the smart safe console assembly 110. In some embodiments, the registration includes a verification process between the electronic device 21 and the smart safe console assembly 110, preferably where the smart safe console assembly 110 includes a verification button, when depressed, facilitates the verification process, more preferably where the verification button allows the electronic device 21 to sync with the smart safe console assembly 110. In some embodiments, the registration process and/or verification process includes connecting one or both of the smart safe console assembly 110 and the electronic device 21 to a wireless internet hotspot. In an exemplary embodiment, the smart safe console assembly 110 broadcasts a WIFI hotspot for the electronic device 21 to connect to, preferably where the hotspot is named with a name that indicates its connection to the smart safe console assembly 110. In an exemplary embodiment, the registration and/or verification process includes one or more of the steps of: 1) depressing the verification button on the smart safe console assembly 110; 2) sending a message from the smart safe console assembly 110 to the electronic device 21, using the WIFI hotspot, where the message indicates that the registration and/or verification process has begun, and preferably sets a time limit for response and/or sets a verification code or message that must be sent to the smart safe console assembly to complete registration or verification; 3) sending a verification code or message to the smart safe console assembly, whether digitally using the WIFI hotspot from the electronic device 21, or manually; and 4) depressing the verification button again to complete registration and/or verification. In such embodiments, the smart safe console assembly opens to allow access after the registration and/or verification process is completed.

The operator 40 may register to the software application by a phone number or other known identification means associated with the electronic device 21. The registration process may further include registration of emergency contact information, such as, but not limited to, emergency contact phone numbers, medical information, contact information for physicians or doctors associated with the user, addresses, and others. The software application may be linked to the cellular-phone-service such that the phone number can be stored in a national database operated by the cellular-phone-service. The software application may be in communication with the vehicle 45 hosting the smart safe console system 100 such that one or more operations (e.g., unlocking the vehicle 45, rolling down windows, etc.) can be performed to the vehicle 45 from the software application. Further, the software application may allow for personalization of features equipped with the smart safe console assembly 110. In some embodiments, the smart safe console system 100 communicates specific commands to the software application when the safe is opened, such as a command to remind the user to update the software application and allows the signals containing the update material to communicate with the electronic device 21 while the electronic device 21 is secured within the smart safe console assembly 110. In some embodiment, updating occurs when the electronic device 21 is charging in the smart safe console assembly 110. In other embodiments, updating can occur in the smart safe console assembly 110 when the electronic device 21 is not charging.

According to one embodiment, the smart safe console system 100 may be arranged as a kit 105. In particular, the smart safe console system 100 may further include a set of instructions 107. The instructions 107 may detail functional relationships in relation to the structure of the smart safe console system 100 such that the smart safe console system 100 can be used, maintained, or the like, in a preferred manner.

Figure 2:
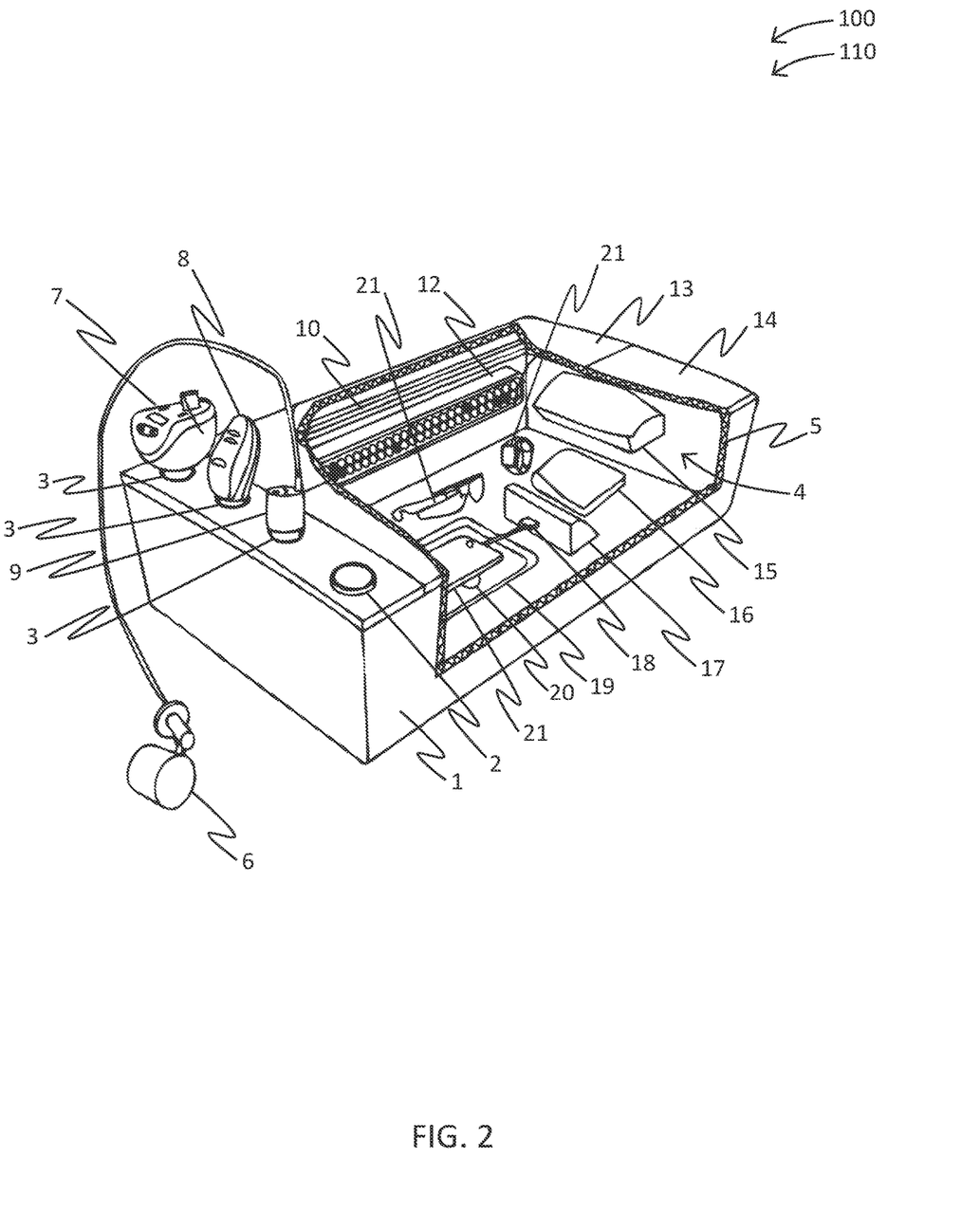
FIG. 2 is a perspective cutaway view of the smart safe console system of FIG. 1, according to an embodiment of the present disclosure.

FIG. 2 shows the smart safe console system 100 of FIG. 1, according to an embodiment of the present disclosure. As above, the smart safe console system 100 may include the smart safe console assembly 110 including the smart safe body 1 suitable to house the at least one electronic device 21. The electronic device 21 may be able to be isolated from hand-held use by the smart safe body 1.

The smart safe console assembly 110 may also include the engager-button 2 configured for controlling input and output communications to and from the electronic device 21 when the vehicle 45 hosting the smart safe console system 100 is in use. The smart safe console assembly 110 may be in communication with the provider and with the vehicle 45 and may be configured to control use of the electronic device 21 in relation to manipulation of the vehicle 45. The provider may provide one or more of: cellular-phone-service, internet service, and/or vehicle navigation services, such as those offered through Apple® or Google® as part of Apple Maps® or Google Maps®, to the electronic device 21. The input and output communications may include sending text or voice recorded messages.

The smart safe console assembly 110 may further comprise at least one cigarette socket 3 along the exterior-portion of the smart safe body 1 configured for communicating and powering one or more external electrical accessories with the smart safe console assembly 110. The external electrical accessories include a transmitter 7, a virtual assistant device 9, a fragrance emitter 8, or combination thereof. The at least one cigarette socket 3 may communicably connect to the smart safe console assembly 110 such that the external electrical accessories are in communication with the provider and with the vehicle 45. Each of the external electrical accessories may be connected (with an adapter) or otherwise equipped with a rearward protruding electrode for contacting a powered electrical contact within the cigarette socket 3.

In some embodiments, the smart safe body 1 further includes a left-wing 13 and a right-wing 14 configured to move between an opened-state and a closed-state. In other embodiments, alternate configurations for the smart safe body which allow for such opening and closing are also envisioned, such as a shutter mechanism which slides to move between the opened-state and the closed-state, either from top to bottom, or left to right, in a diaphragm configuration, or any other equivalent means as known in the art. When in the opened-state, the electronic device 21 may be inserted or removed from the smart safe body 1. When in the closed-state, the electronic device 21 may be isolated from hand-held use. The left-wing 13 and the right-wing 14 may include a liner 5. Furthermore, the liner 5 may extend around the entire smart safe body 1. The liner 5 comprises of a sound-proofing material and is configured to dampen and inhibit sounds from the electronic device 21 from reaching the operator 40 of the vehicle 45. Sounds generated from the electronic device 21 may distract the operator 40 unless otherwise dampened.

In some embodiments, the smart safe body 1, and/or the liner 5, may include at least one material with electromagnetic radiation shielding properties. Such electromagnetic shielding properties include, for example, the property of preventing wireless electronic communication with an electronic device placed within the smart safe body. In some embodiments, the electromagnetic shielding properties thus include shielding of one or more of any radio frequencies utilized by electronic devices to communicate, such as, but not limited to, frequency bands associated with the following technological standards: GSM, UMTS, LTE, 5G NR, and CDMA. Such frequency bands may include radio frequencies in the ranges of 800-6000 MHz. In some embodiments, the electromagnetic shielding properties may include shielding any other number of frequencies associated with technologies which electronic devices use to communicate, such as Bluetooth, wireless LAN, RFID, and others.

In some embodiments, the smart safe body 1, and/or the liner 5, may include at least one material with antiviral properties. Such antiviral properties may include, for example, the properties of killing and/or inactivating any viruses and/or virus particles which come into contact with the interior or exterior of the smart safe assembly, preferably in less than 60 minutes, more preferably where at least 99.9999% of such virus is destroyed and/or inactivated. In such embodiments, the material may exhibit its antiviral properties through inducing, either directly or indirectly, the degradation of viral genetic material. Examples of viruses killed and/or inactivated include SARS-CoV-2, any other virus associated with COVID-19, or any other viruses. Exemplary embodiments of the at least one material with electromagnetic shielding properties and/or the at least one material with antiviral properties may be found in U.S. application Ser. No. 16/802,830, entitled "Urethane and Graphene Interior Trim Panel", filed Feb. 27, 2020, the entirety of which is hereby incorporated by reference.

In some embodiments, the smart safe body may include a wireless charging apparatus configured to charge the electronic device, when the electronic device is placed within the safe body. Such wireless charging apparatus may use any such wireless charging technologies for charging electronic devices, such as wireless inductive charging, as may be known in the art. In exemplary embodiments, inductive charging technology standards, such as Qi and/or PMA may be used.

The smart safe body 1 may include an interior-housing 4 defined by one or more walls, the left-wing 13, and the right-wing 14. The smart safe body 1 can be provided in a variety of shapes and sizes that fit in the vehicle 45. For example, the smart safe body 1 may include a curved surface on one or more walls or be substantially rectangular/squared. The interior-housing 4 may be equipped with an apparatus configured to emit sanitizing radiation, such as ultraviolet light, into the interior of the safe body, when the safe body is closed. In an exemplary embodiment, the interior-housing 4 may be equipped with an ultraviolet light disinfecting device 12 configured to destroy and/or inactivate one or more of: bacteria, viruses, yeast, or other pathogens, on one or more surfaces housed within the smart safe body 1. In an exemplary embodiment, the sanitizing radiation emitted by the apparatus is sufficient to destroy or inactivate SARS-CoV-2. The interior-housing 4 may further be equipped with a sunglasses holder 15, a wallet holder 16, a charging unit 17, a docking station 19, an electromagnetic field (EMF) battery 20, colored LED light strips 10, or combination thereof. The colored LED light strips 10 may be customized (i.e., changing of light colors) via the SW App. Additionally, other features may be equipped in the interior-housing not shown in FIG. 2, such as a cooling fan, when desired.

Figure 3:
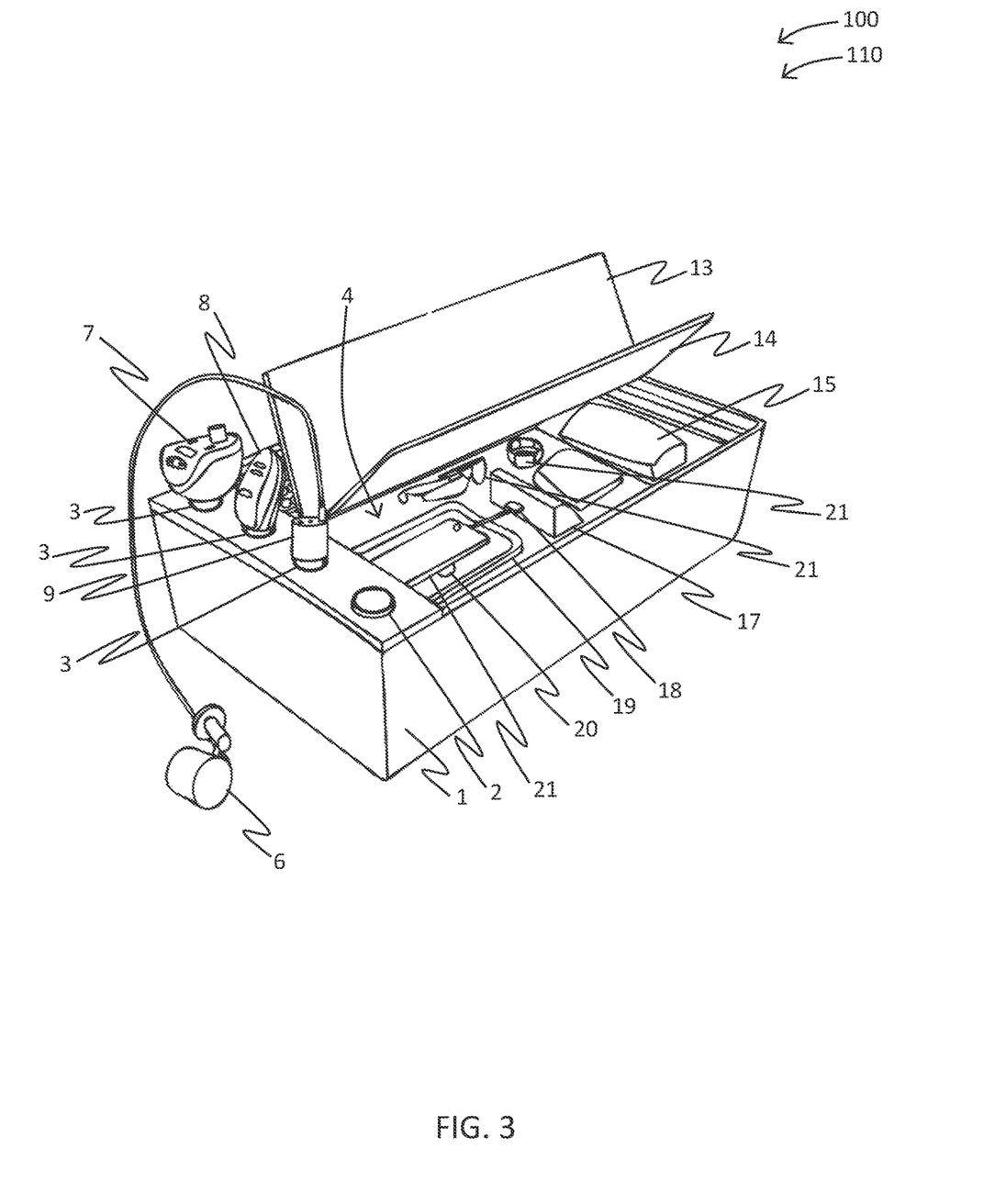
FIG. 3 is a perspective view of the smart safe console system of FIG. 1, according to an embodiment of the present disclosure.

FIG. 3 is a perspective view of the smart safe console system 100 of FIG. 1, according to an embodiment of the present disclosure. As noted above, the smart safe body 1 includes the left-wing 13 and the right-wing 14 configured to move between the opened-state and the closed-state. When in the opened-state, the electronic device 21 may be inserted or removed from the smart safe body 1. When in the closed-state, the electronic device 21 may be isolated from hand-held use. The left-wing 13 and the right-wing 14 may open on opposite sides (as shown) or they may open on the same side.

The smart safe body 1 may further include the interior-housing 4 defined by one or more walls, the left-wing 13, and the right-wing 14. The interior-housing 4 may be equipped with the charging unit 17 including an electrical connector 18 (e.g., USB socket and/or plug) for connecting the electronic device 21 to be charged, and the docking station 19 for holding the electronic device 21 proximate the charging unit 17 and the electrical connector 18. The interior-housing 4 may further be equipped with the electromagnetic field (EMF) battery 20 positioned below the docking station 19 and is configured prevent radiation from emitting from the electronic device 21 when housed within the smart safe body 1.

The smart safe assembly 110 may be in communication with a control module configured to permit non-operation of the vehicle 45 when the electronic device 21 is not in a sensed-condition, and operation of the vehicle 45 when the electronic device 21 is in the sensed-condition. The sensed-condition may be when the electronic device 21 is electrically connected to the charging unit 17, and the left-wing 13 and the right-wing 14 is in the closed-state. The charging unit 17, and the left-wing 13 and the right-wing 14 may include at least one operation sensor coupled to the control module. The at least one operation sensor may be configured to detect the sensed-condition and send to the control module upon receipt of the sensed-condition. It should be noted that the electronic device 21 may be required to be registered with the software application prior to receipt of the sensed-condition such that all electronic devices 21 can be accounted for.

Figure 4:
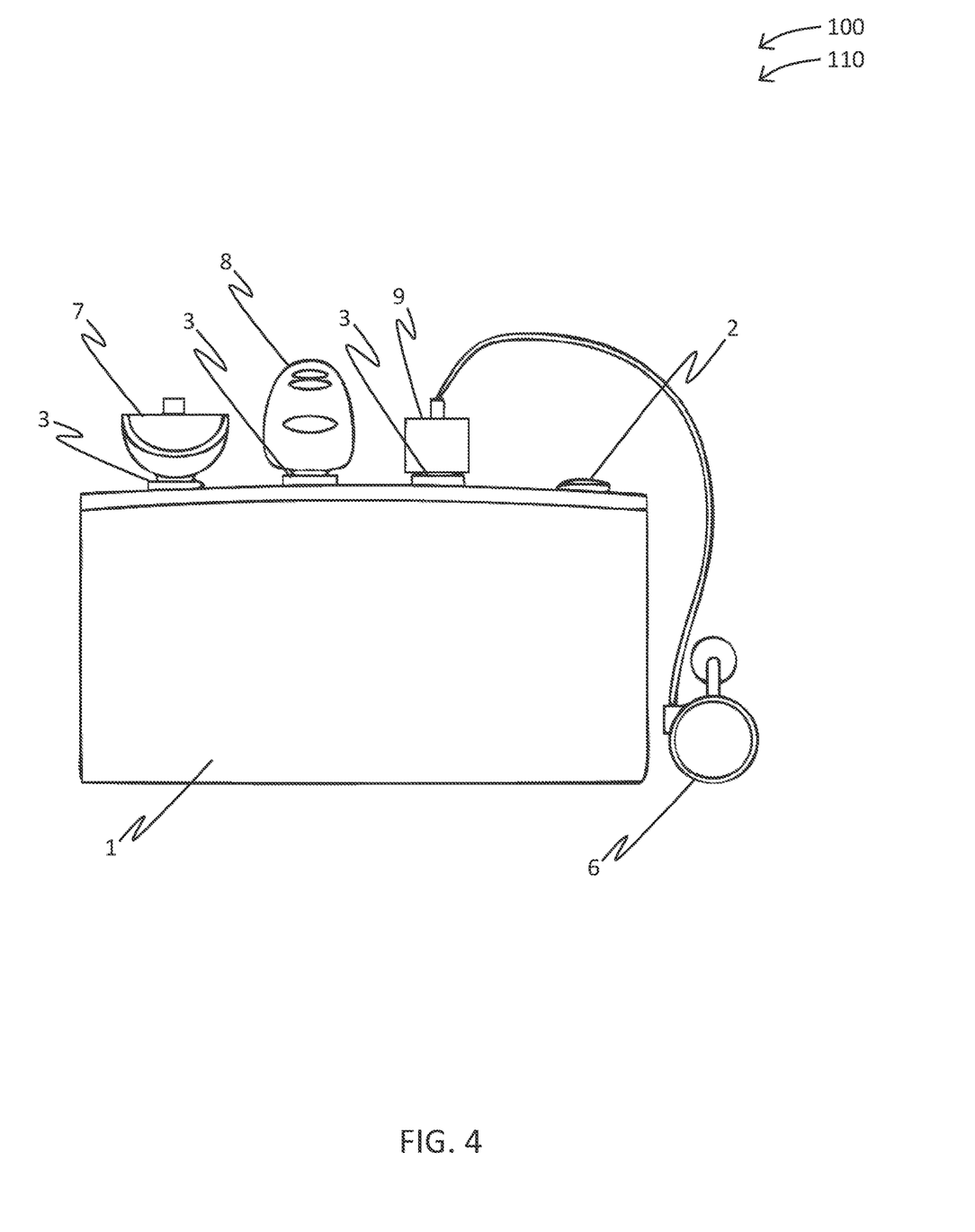
FIG. 4 is a front view of the smart safe console system of FIG. 1, according to an embodiment of the present disclosure.

FIG. 4 is a front view of the smart safe console system 100 of FIG. 1, according to an embodiment of the present disclosure. The smart safe console assembly 110 may comprise the at least one cigarette socket 3 along the exterior-portion of the smart safe body 1 configured for communicating and powering the one or more external electrical accessories with the smart safe console assembly 110. The external electrical accessories may include the transmitter 7, the virtual assistant device 9, and the fragrance emitter 8. The fragrance emitter 8 may be configured to emit one or more scents within the vehicle 45. The fragrance emitter 8 may continually emit scents or periodically on a timer. Other features may be included.

In some embodiments, the virtual assistant may be hosted entirely on the smart safe assembly or on the electronic device itself. However, in other embodiments, the virtual assistant may be hosted in a separate device. The virtual assistant device 9 may be in communication with the electronic device 21 (hosting the software application) and the engager-button 2 and is configured to enable voice input communication and voice output communication between the virtual assistant device 9 and the electronic device 21 when a signal is received from the engager-button 2. Commonly known virtual assistant devices 9 include AMAZON ECHO, ALEXA, and GOOGLE ASSISTANT all of which may be pre-equipped with one or more speaker(s) and microphone(s) to enable the voice input communication and the voice output communication. The voice input communication and the voice output communication may include asking and receiving information ranging from the weather report to any encyclopedia question. Further, the operator 40 may personalize the voice input communication and the voice output communication via the virtual assistant device 9 to provide voices to be male, female, celebrity, and the like. The virtual assistant device 9 may include a cord and a suction cup 6 such that the virtual assistant device 9 can be fastened to the windshield of the vehicle 45.

The virtual assistant may be in communication with a navigational system (e.g., GARMIN technology) hosted in the vehicle 45 and/or with the electronic device 21. This way the electronic device 21 can remain in the smart safe body 1 while the operator 40 uses this technology for navigation. The operator 40 of the vehicle 45 can engage the engager-button 2 to provide voice input communication. The voice input communication may provide one or more services to the operator 40 such as but not limited to voice recorded messages processed on the virtual assistant to send to the desired recipient via the cellular-phone-service (e.g., notifying the desired recipient when the operator 40 is unable to respond due to driving and/or approximate times when the operator 40 will be free to respond based on communications received by the navigational system), purchasing of one or more items via the internet service, requesting a list of songs played on the radio, inputting personal information associated with the operator 40 to be stored on the electronic device 21, requesting specific responses based on the inputted personal information (i.e. bank account information), etc. The voice output communication may provide one or more services to the operator 40 such as reminders from the calendar on the electronic device 21, reminders for ongoing conversations on the electronic device 21, automatic updates for the electronic device 21, responses to the voice input communication, and the like. The virtual assistant may provide vehicle navigational services itself, or other vehicle utilities, preferably through compatibility through third-party applications, although the use of proprietary software is also contemplated. Examples of such vehicle navigational applications or vehicle utility applications intended to be compatible with the virtual assistant include any driving or navigational application provided by Apple® or Google®, such as Apple Maps®, Apple CarPlay®, or Google Maps®, MirrorLink®, Drivemode®, Cardo®, Android Auto®, navigational systems offered by Airbiquity® or Orderwerks®, JBL Smartbase® associated applications, Car dashdroid-Car infotainment®, CARFAX Car Care®, Cycle®, Driver®, Fully®, HONK Partn®, and any others.

In some embodiments, the smart safe console system includes a microphone configured to capture a voice of the user. Such voice capture may be used to interact with one or more of the features of the smart safe console system, through voice recognition software, or other means. In some embodiments, the smart safe console system assembly is configured to communicate with an audio system of the vehicle. Such communication with the audio system of the vehicle may be used for, amongst other functions, communicating alerts or other information to the user, or providing audio functions of the smart safe console system, such as music players, or hands-free call answering. In an exemplary embodiment, the assembly is configured to answer incoming phone calls, preferably through manual means such as pushing a button, more preferably through voice activated means, by using the microphone, and even more preferably by having the assembly automatically answer calls, and provide hands-free phone service by directing communication with the electronic device through the audio system and the microphone.

The transmitter 7 may be configured to communicate with a controller and a processor. The software application may be programmed to include a switch that enables communication between the transmitter 7 and the controller and the processor. The switch may be manually activated via interfacing with the software application or activated once the navigational system equipped on the vehicle 45 receives a signal that the desired destination (e.g., home) is less than a predetermined distance away. The controller and the processor may be communicably coupled to one or more features within the desired destination such that the one or more features can be turned on/off. The one or more features may include but not be limited to an alarm system, temperature settings, propane fireplace, lighting, sound system, such as a stereo, and powered kitchen accessories. Those with ordinary skill in the art will now appreciate that upon reading this specification and by their understanding the art of transmitters as described herein, methods of communication with powered objects via the transmitter 7 will be understood by those knowledgeable in such art.

Figure 5:
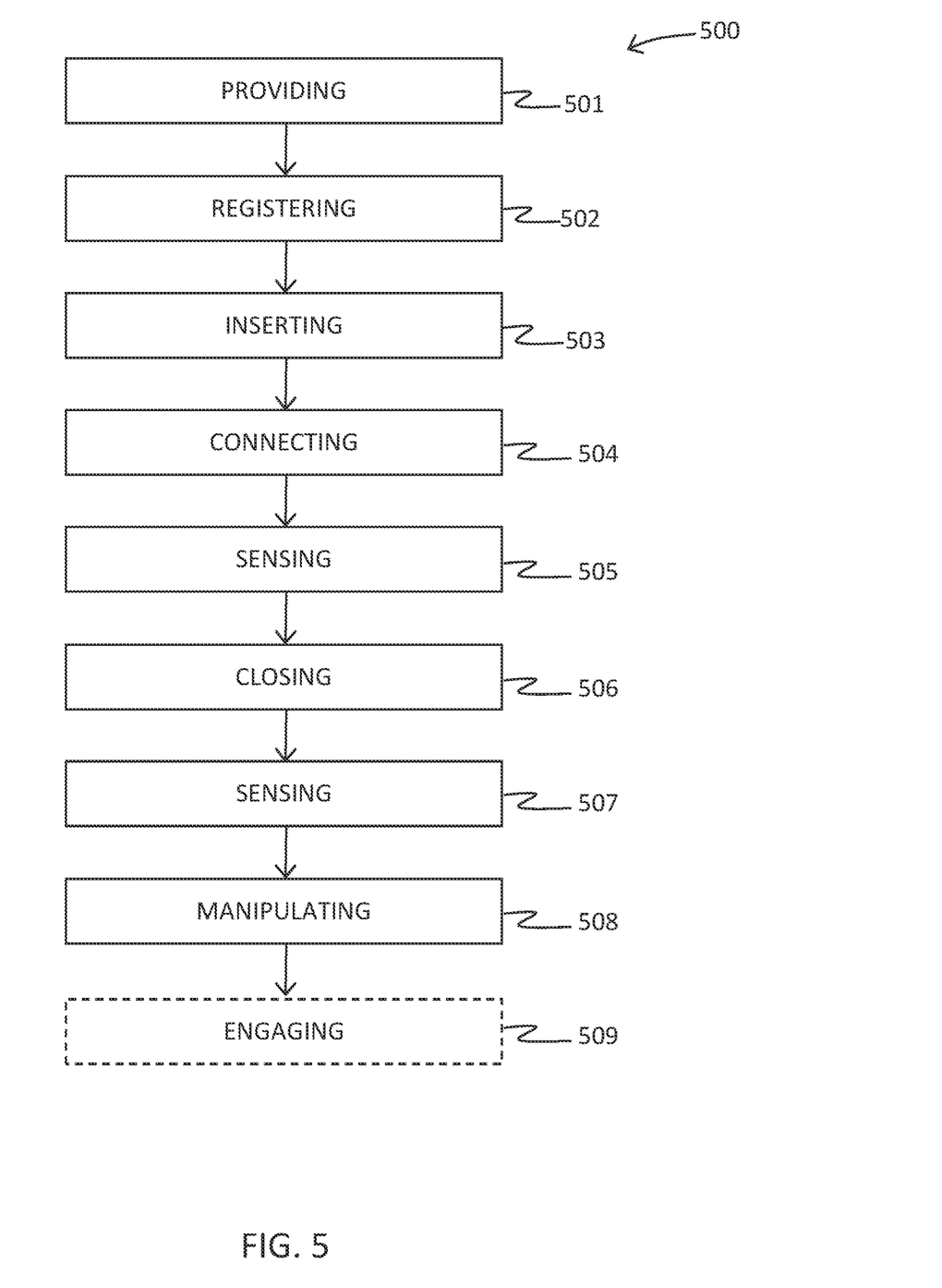
FIG. 5 is a flow diagram illustrating a method of using a smart safe console system, according to an embodiment of the present disclosure.
Figure 6:
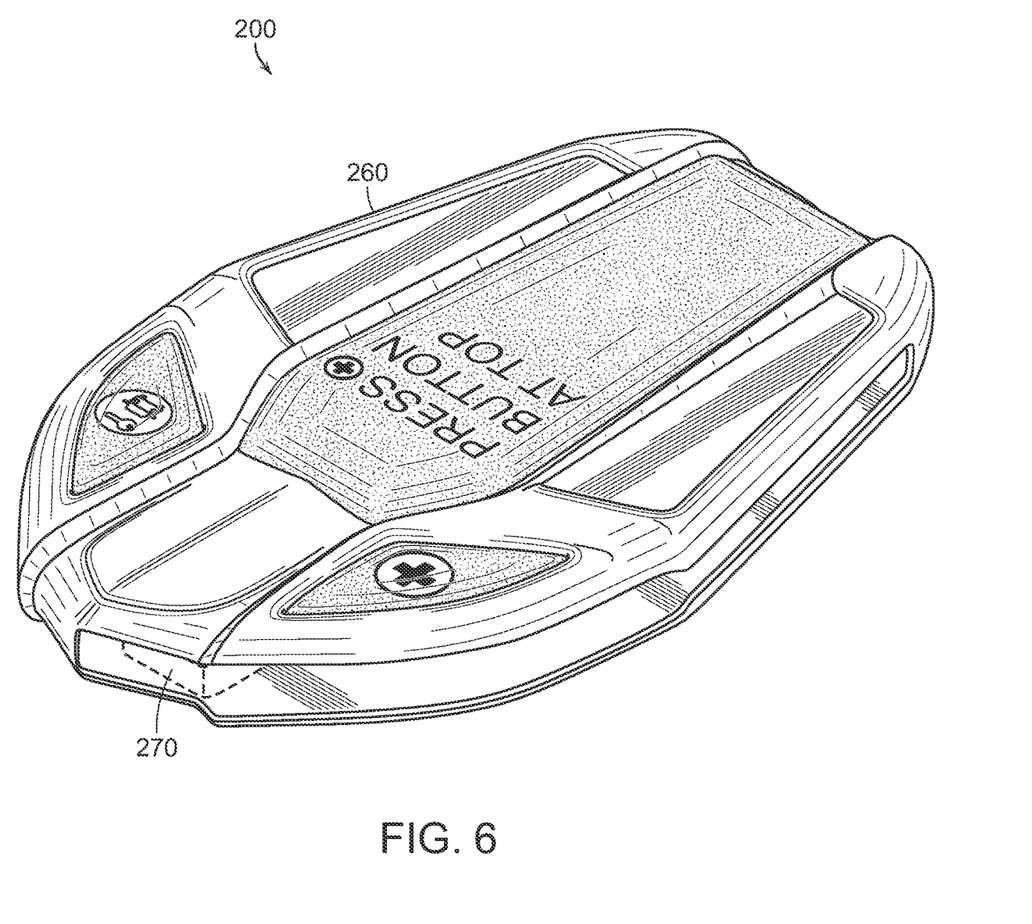
FIG. 6 is a perspective view of the handheld device of the override apparatus of the smart safe console system, according to an embodiment of the disclosure.
Figure 7:
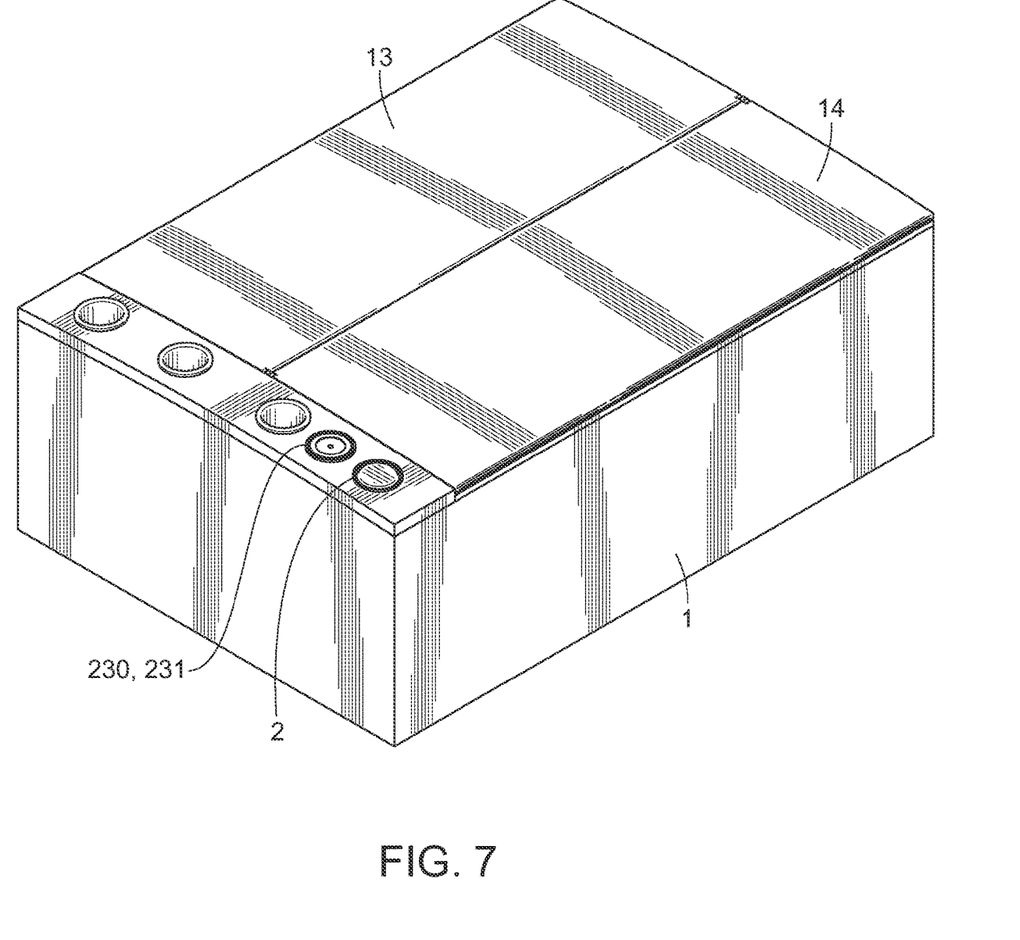
FIG. 7 is a perspective view of the smart safe console system, according to an alternate embodiment of the disclosure.
Figure 8:
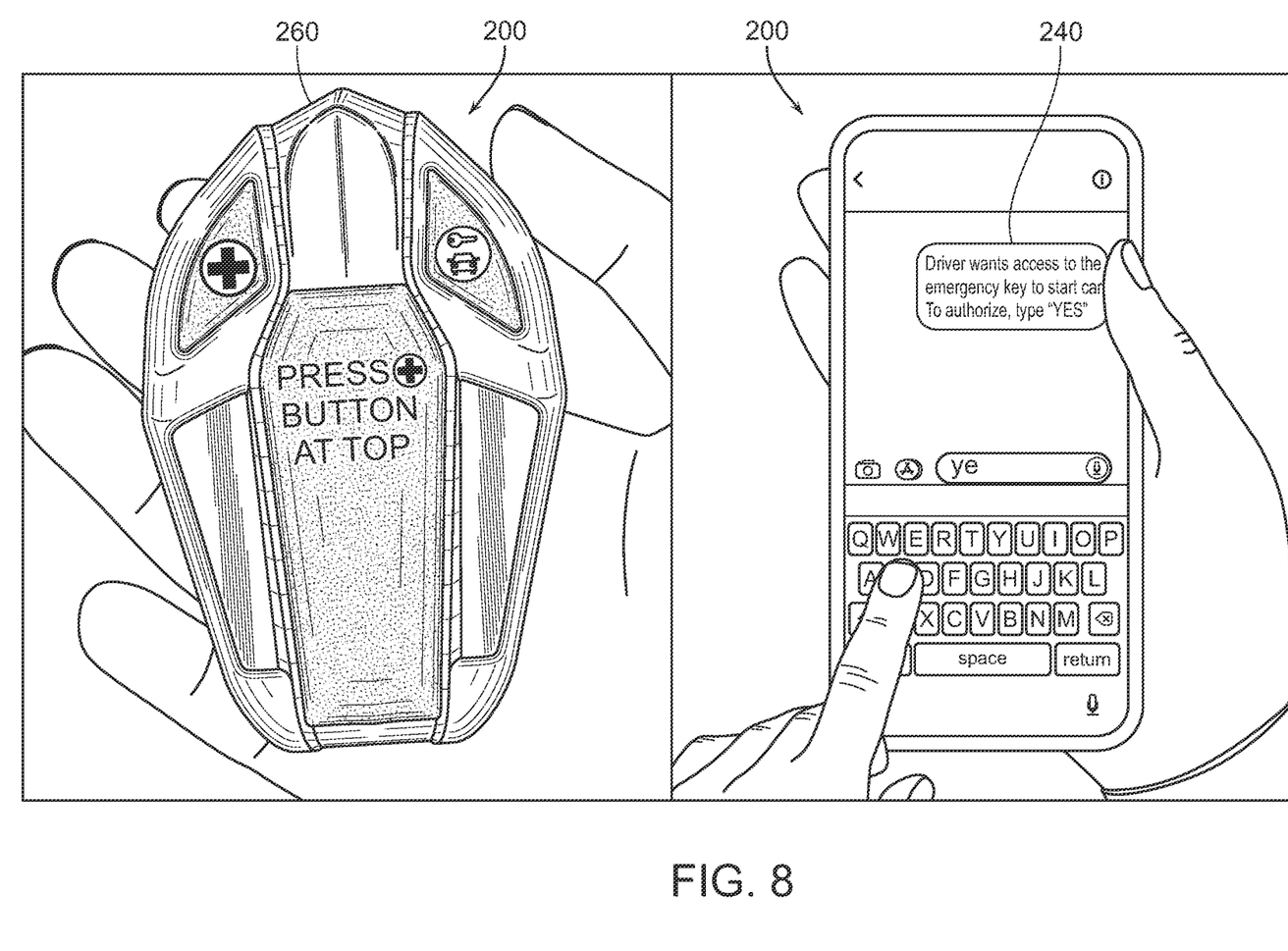
FIG. 8 is an overhead view of an illustration of the external user being notified of a request to override the smart safe console system, according to an embodiment of the present disclosure.
Figure 9:
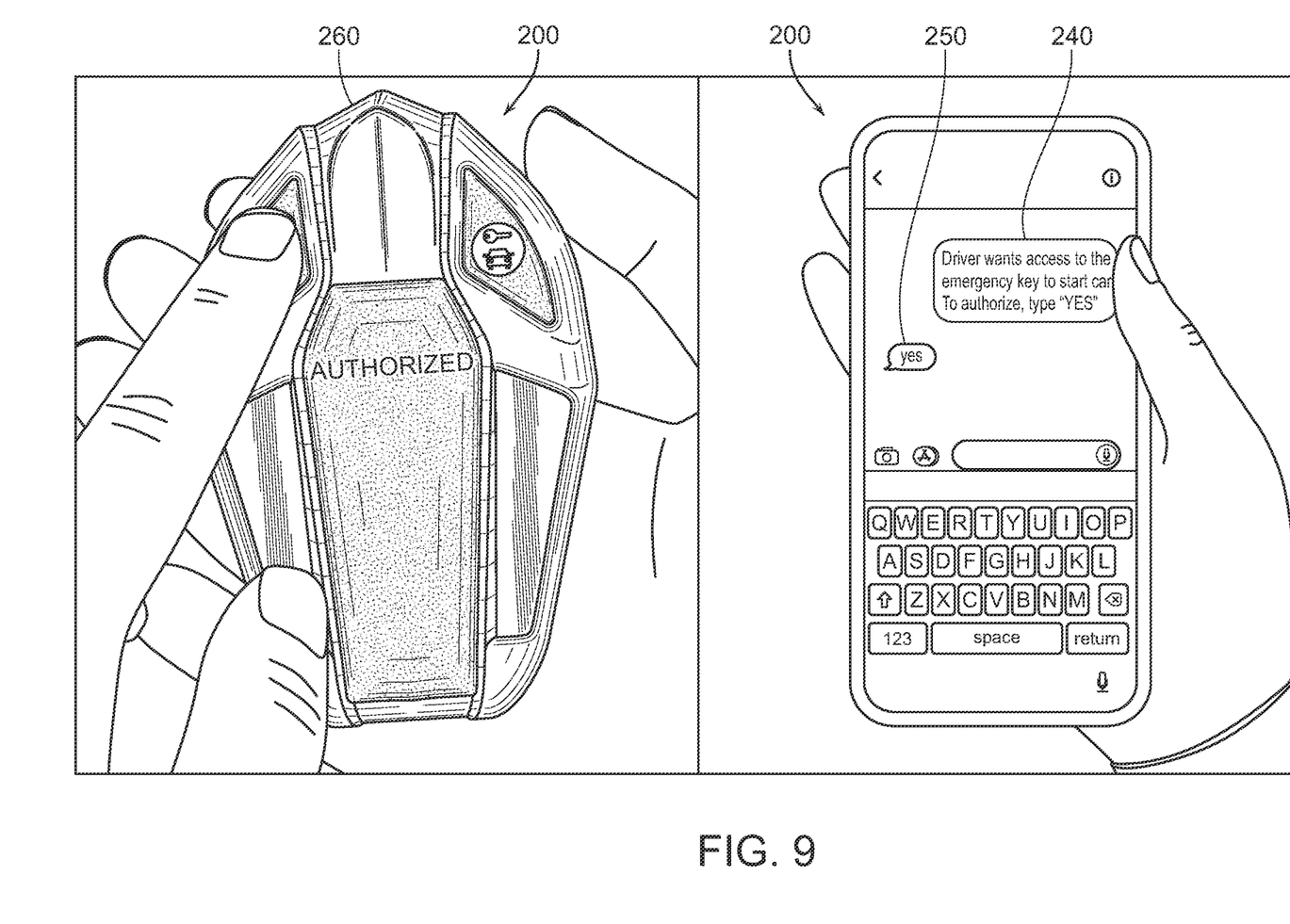
FIG. 9 is an overhead view of an illustration of the external user granting a request to override the smart safe console system in response to the request of FIG. 8, according to an embodiment of the present disclosure.

FIG. 5 is a flow diagram illustrating a method for using a smart safe console system 500, according to an embodiment of the present disclosure. In particular, the method for using the smart safe console system 500 may include one or more components or features of the smart safe console system 100 as described above. As illustrated, the method for using the smart safe console system 500 may include the steps of: step one 501, providing a smart safe console assembly 110 including a smart safe body 1 suitable to house at least one electronic device 21, an engager-button 2 configured for controlling input and output communications to and from the electronic device 21 when a vehicle 45 hosting the smart safe console system 100 is in use; the smart safe body 1 further includes a left-wing 13 and a right-wing 14 configured to move between an opened-state and a closed-state, and an interior-housing 4 defined by one or more walls, the left-wing 13, and the right-wing 14; the smart safe console assembly 110 may be in communication with a provider and with the vehicle 45 and may be configured to control use of the electronic device 21 in relation to manipulation of the vehicle 45; step two 502, registering the electronic device 21 with a software application in communication with the smart safe assembly 110; step three 503, inserting the electronic device 21 into the smart safe body 1; step four 504, connecting the electronic device 21 to a charging unit 17 equipped in the interior-housing 4; step five 505, sensing the electronic device 21 is connected to the charging unit 17 via at least one operation sensor and registered with the software application; step six 506, closing the left-wing 13 and the right-wing 14; step seven 507, sensing the left-wing 13 and the right-wing 14 are in the closed-state via the at least one operation sensor; step eight 508, manipulating the vehicle 45 (e.g., turning the vehicle 45 on); and step nine 509, engaging the engager-button 2 for controlling the input and the output communications to and from the electronic device 21.

It should be noted that step nine 509 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the smart safe console system 100 (NOTE: e.g., different step orders within above-mentioned list, elimination or addition of certain steps, including or excluding certain maintenance steps, etc.), are taught herein.

In some embodiments, the smart safe console system may be a before-market product for vehicles. In some embodiments, the smart safe console system may be an after-market product for vehicles. In many embodiments, the smart safe console system may be made with many different dimensions and/or shapes, or is adjustable in its dimensions and/or shapes, so as to properly fit many different shapes, sizes, and makes of various vehicles and the various middle consoles or center armrests that are in such vehicles.

In some embodiments, with reference to FIG. 6-11 the smart safe console system 100 includes an override apparatus 200 configured to allow a user to override the control module and permit operation of the vehicle 45, preferably when the electronic device 21 is not secured within the safe body 1, or regardless of whether the electronic device 21 is secured within the safe body 1 or not. In some embodiments, the override apparatus 200 may be configured to require the user to enter information used to verify the user's identity before the override apparatus 200 will override the control module. In some embodiments, with reference to FIG. 8-9, the override apparatus 200 may be configured to include a function to notify an external user 250, such as an administrator, that override of the control module is requested, and will not override the control module until such request is granted by the external user 260. In some embodiments, the override apparatus 200 directly overrides the control module. In some embodiments, the override apparatus 200 may provide the user with a manual means of overriding the control module, such as a specialized key 270 or other type of tool or tools. In a preferable embodiment, the manual means of overriding the control module includes a specialized key 270, and the smart safe assembly 110 includes a keyhole 210 corresponding to the specialized key 270. In an exemplary embodiment, the keyhole 210 on the smart safe assembly is hidden behind an override button, the override button configured such that when depressed, opens to reveal the keyhole 210. In some embodiments, when the override button is depressed, the override apparatus 200 is engaged, and the keyhole 210 is only revealed once the override apparatus 200 verifies the user's identity. In some embodiments, the specialized key/override key 270 is contained in a compartment, and is only provided to the user once the override apparatus 200 verifies the user's identity. In some embodiments, further steps are required to enable either the override apparatus 200 to override the control module, or to reveal the override key 270, such as requiring the user to use a specialized tool 220, such as a screwdriver, to remove certain screws and/or caps 230 located on positions on the smart safe assembly 110 and/or inside the center console armrest. In some embodiments, the override apparatus 200 only overrides the control module once the override key 270 is inserted into the keyhole 210 and turned. In some embodiments, the smart safe console system 100 includes an emergency button, which when depressed for a predetermined amount of time will notify the authorities, such as the police, of the vehicle's location, preferably with a request for assistance.

In some embodiments, the override apparatus 200 may comprise a single device, or multiple devices linked together electronically, whether through wires or wirelessly. In some embodiments, with reference to FIG. 6, the override apparatus 200 comprises a handheld device 260 with buttons for ease of the user. In an embodiment, the handheld device 260 contains the override key 270, preferably within an interior compartment, and more preferably such that the key 270 is only revealed when the external user, such as the administrator, is notified 240 and grants a request to override the smart safe console system 250. In an embodiment, the key 270 is revealed by sliding, or otherwise displacing the key 270 out of the interior compartment, for example, such as through an unfolding hinge mechanism similar to a side-opening switchblade. In an embodiment, the handheld device 260 and/or override apparatus 200 may comprise an override notification system, for example comprising colored lights or sound systems that notify the user when the administrator or external user accepts the request to override the smart safe console system 100. For example, the colored lights may change in response to acceptance by the administrator of the request to override the smart safe console system 100 by changing from red to green or an integrated sound system may play a notification noise, such as chimes, ringing, beeping, songs, voices, or other sounds customizable by the user. Other methods of notifying the user that the request to override the smart safe console system 100 are also contemplated, such as vibration systems located in the override apparatus 200 and/or the handheld device 260. In an embodiment, the override key 270 may only be revealed upon further action by the user, such as by pressing an additional specified button on the handheld device 260, after the administrator or external user grants the request 250 to override the smart safe console system. In some embodiments, with reference to FIG. 8-9, the administrator may be notified 240 through the use of an app linked to the smart safe console system 100 and an electronic device 21 of the user. In some embodiments, the override apparatus 200 may comprise a digital screen and interface, such as a touchscreen, to allow the user to override the smart safe console system 100 using the override apparatus 200 alone. The digital screen and interface of the override apparatus 200 may also serve to notify the user that a request to override the smart safe console system has been granted 250 by an external user or administrator.

Figure 10:
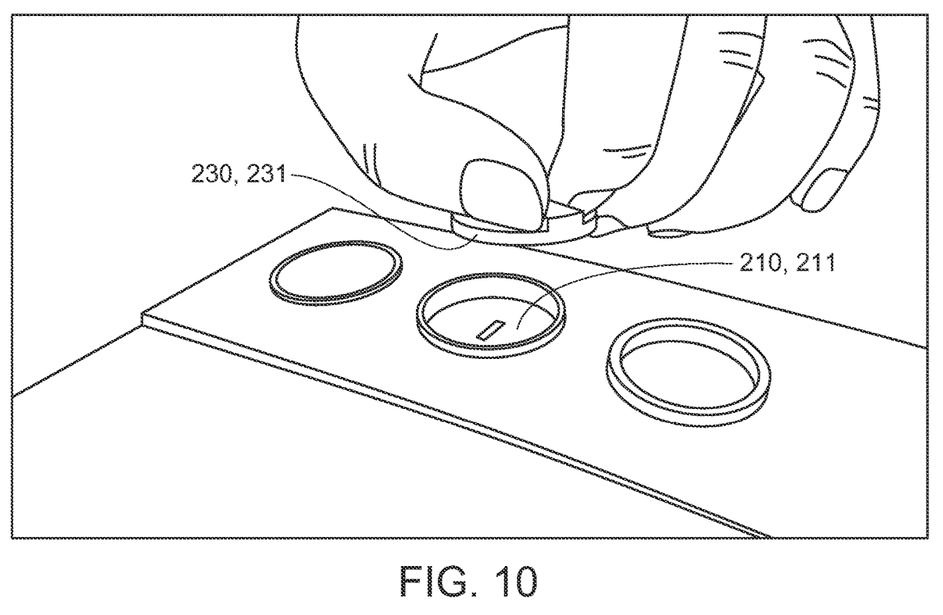
FIG. 10 is a perspective view of the first keyhole of the smart safe console system, according to an embodiment of the present disclosure.
Figure 11:
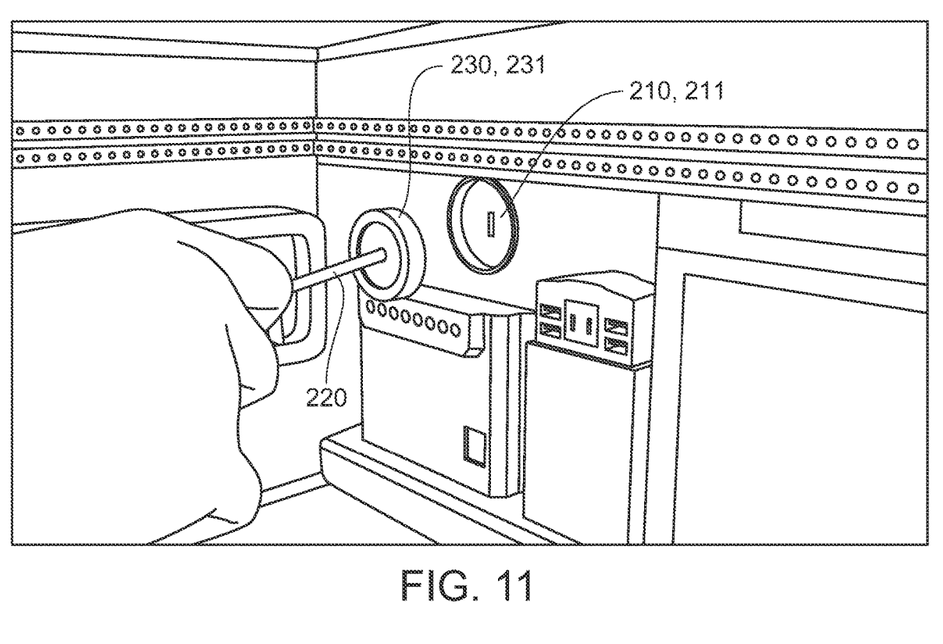
FIG. 11 is a perspective view of the second keyhole of the smart safe console system, according to an embodiment of the present disclosure.

In some embodiments, with reference to FIG. 10-11, the keyhole 210 for the override key 270 includes multiple keyholes, preferably including at least a first keyhole 211, which when turned by inserting the override key 270, opens the safe body of the smart safe console system, and a second keyhole 212, which when turned by inserting the override key 270, allows override of the smart safe console system 100 and permits operation of the vehicle 45. In some embodiments, each of the one or more keyholes 210 is hidden behind caps or screws 230, such that a specialized tool 220 provided with the override apparatus, such as a hex key, Allen wrench, or screwdriver, is needed to remove the caps or screws 230 and reveal the one or more keyholes 210. In an exemplary embodiment, the user must remove a first cap 231 using the specialized tool 220, insert the override key 270 into a first keyhole 211 to open the safe body, then remove a second cap 232 using the specialized tool 220, and insert the override key 270 into a second keyhole 212 in order to override the smart safe console system 100 and operate the vehicle 45. Preferably, the first cap 231 and the first keyhole 211 may be located anywhere on the smart safe body 1, but the second cap 232 and the second keyhole 212 is located towards the front of the interior of the smart safe body 1. In an exemplary embodiment, once the user inserts the override key 270 into the second keyhole 212 and turns it, an additional notification is sent to the external user or administrator requesting override of the smart safe console system 100. In this exemplary embodiment, the vehicle 45 may only be operated and the smart safe console system 100 overridden once the external user or administrator grants this request. In an exemplary embodiment, the user must concurrently insert the override key 270 into the second keyhole 212, and turn it, preferably clockwise, while depressing a start button of the vehicle in order to override the smart safe console system 100 and begin operation of the vehicle 45 and/or start an engine of the vehicle. In some embodiments, the override key 270 may be turned in either direction once inserted into a keyhole 210.

In some embodiments, the override apparatus 200 and/or the handheld device 260 comprises an emergency notification button, which when activated, alerts emergency systems, such as the police, for example, by providing identification information about the user, information about the vehicle 45, and/or information about the location of the vehicle. In some embodiments, once the external user or administrator grants a request 250 to override the smart safe console system 100, the granted authority to override the smart safe console system 100 has a predetermined duration, such as for 24 hours, which may be customizable by the external user or administrator. After the duration for such granted authority has elapsed, the user must request authorization to override the smart safe console system 100 from the external user or administrator again before being able to override the smart safe console system 100 and operate the vehicle 45. In an embodiment, the override apparatus 200 and/or the handheld device 260 is waterproof and/or water resistant. In an embodiment, the override key 270 may also be capable of opening one or more of the vehicle 45 doors or trunk, but preferably may not be able to operate the vehicle 45 alone. In some embodiments, the override apparatus 200 comprises a case configured for containing one or more of the handheld device 260 and/or the specialized tool 220. In some embodiments, the override key 270, the override apparatus 200, and/or the handheld device 260 may comprise some functionality of a remote start system when used in conjunction with the smart safe console system 100 when using the override apparatus 200 to override the smart safe console system 100 and operate the vehicle 45 and/or start the engine of the vehicle 45. In an exemplary embodiment, the smart safe console system 100 and/or the override apparatus 200 comprises a cap 230, which when removed by the user using a specialized tool 220, reveals a keyhole 210 for use with the override key 270 in starting the engine of the vehicle 45 when the override key 270 is inserted into the keyhole 210 and turned, and a verification button of the override apparatus 200 and/or handheld device 260 is depressed.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents. Implementations may also include one or a combination of any two or more of the aforementioned features or embodiments.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

The disclosure is illustrated throughout the written description. It should be understood that numerous variations are possible while adhering to the inventive concept. Such variations are contemplated as being a part of the present disclosure.

What is claimed is:

1. A smart safe console system comprising an assembly mounted in a vehicle, the smart safe console system including:
    a safe body that during vehicle use secures an electronic device against physical access,
        wherein the safe body opens and closes, and, when closed, the safe body secures the electronic device against physical access,
        wherein the safe body is configured to communicate with the electronic device, when the electronic device is placed within the safe body,
    a button that controls input to and output from the electronic device;
    a wireless charging apparatus configured to wirelessly charge the electronic device, when the electronic device is placed within the safe body;
    a control module that is configured to prevent operation of the vehicle unless the safe body is closed and the electronic device is secured within the safe body; and
    an override apparatus configured to allow a user to override the control module and permit operation of the vehicle when the electronic device is not secured within the safe body,
        wherein the override apparatus comprises a handheld device,
        wherein the override apparatus comprises a notification system configured to notify an external user when a user requests override of the control module and requires authorization from the external user to override the control module and permit operation of the vehicle.

2. The smart safe console system of claim 1, wherein the notification system comprises a notification indicator configured to notify the user when the external user has granted authorization to override the control module and permit operation of the vehicle.

3. The smart safe console system of claim 2, wherein the notification indicator comprises one or more of: colored lights or LEDs, vibration systems, digital screens, or sound systems.

4. A smart safe console system comprising an assembly mounted in a vehicle, the smart safe console system including:
    a safe body that during vehicle use secures an electronic device against physical access,
        wherein the safe body opens and closes, and, when closed, the safe body secures the electronic device against physical access,
        wherein the safe body is configured to communicate with the electronic device, when the electronic device is placed within the safe body,
    a button that controls input to and output from the electronic device;
    a wireless charging apparatus configured to wirelessly charge the electronic device, when the electronic device is placed within the safe body;
    a control module that is configured to prevent operation of the vehicle unless the safe body is closed and the electronic device is secured within the safe body; and
    an override apparatus configured to allow a user to override the control module and permit operation of the vehicle when the electronic device is not secured within the safe body,
        wherein the override apparatus comprises a handheld device,
        wherein the handheld device comprises an override key,
        wherein the override key is concealed within an internal compartment of the handheld device, and
        wherein the override apparatus notifies an external user when a user requests override of the control module and requires authorization from the external user to displace the override key from the internal compartment.

5. The smart safe console system of claim 4, wherein the safe body comprises a first cap concealing a first keyhole and a second cap concealing second keyhole, the first keyhole configured such that when the override key is inserted into the first keyhole and turned, the safe body is opened, and the second key configured such that when the override key is inserted into the second keyhole and turned, an engine of the vehicle is started and operation of the vehicle is permitted.

6. The smart safe console system of claim 5, wherein the override apparatus further comprises a specialized tool for removing each of the first cap and the second cap to reveal each of the first keyhole and the second keyhole, respectively.

7. The smart safe console system of claim 6, wherein the first keyhole is disposed on the exterior of the safe body and the second keyhole is disposed in the interior of the safe body.

8. The smart safe console system of claim 6, further comprising an override case designed to contain the handheld device and the specialized tool.

* * * * *